United States Patent
Pelly et al.

(10) Patent No.: US 7,284,129 B2
(45) Date of Patent: Oct. 16, 2007

(54) DATA PROCESSING APPARATUS AND METHOD

(75) Inventors: Jason Charles Pelly, Reading (GB); Daniel Warren Tapson, Basingstoke (GB)

(73) Assignee: Sony United Kingdom Limited, Weybridge (GB)

(*) Notice: Subject to any disclaimer, the term of this patent is extended or adjusted under 35 U.S.C. 154(b) by 753 days.

(21) Appl. No.: 10/317,634

(22) Filed: Dec. 12, 2002

(65) Prior Publication Data

US 2003/0131242 A1 Jul. 10, 2003

(30) Foreign Application Priority Data

Dec. 13, 2001 (GB) ................. 0129841.3

(51) Int. Cl.
*H04L 9/00* (2006.01)
*H04N 7/167* (2006.01)
*H04K 1/00* (2006.01)

(52) U.S. Cl. .............. 713/176; 380/201; 705/57
(58) Field of Classification Search .............. None
See application file for complete search history.

(56) References Cited

U.S. PATENT DOCUMENTS

| | | | |
|---|---|---|---|
| 5,339,108 A * | 8/1994 | Coleman et al. | 375/240.2 |
| 5,809,139 A * | 9/1998 | Girod et al. | 380/202 |
| 5,875,249 A * | 2/1999 | Mintzer et al. | 380/54 |
| 5,920,578 A * | 7/1999 | Zook | 714/755 |
| 6,037,984 A * | 3/2000 | Isnardi et al. | 375/240.21 |
| 6,101,602 A | 8/2000 | Fridrich | |

(Continued)

FOREIGN PATENT DOCUMENTS

EP 1 098 522 5/2001

(Continued)

OTHER PUBLICATIONS

Duan F Y et al: "Intra-block algorithm for digital watermarking", Pattern Recognition, 1998. Proceedings. Foruteenth International Conference on Brisbane, QLD., Australia Aug. 16-20, 1998, Los Alamitos, CA, USA, IEEE Comput. SO, US, Aug. 16, 1998, pp. 1589-1591, XP010297885 ISBN: 0-8186-8512-3.

(Continued)

*Primary Examiner*—Gilberto Barrón, Jr.
*Assistant Examiner*—Virgil Herring
(74) *Attorney, Agent, or Firm*—Oblon, Spivak, McClelland, Maier & Neustadt, P.C.

(57) ABSTRACT

A watermarking system includes an encoding data processor operable to generate at least one marked version of an original item of material by introducing one of a predetermined set of code words into a copy of the original material item. The apparatus has a code word generator operable to provide the code word having a plurality of code word coefficients, and an encoding processor operable to combine the code word coefficients with the material. Each of the plurality of code words of the set is uniquely associated with a data word having first and second fields. Each of a set of values of the first field is represented as a first part of the code word having a first plurality of coefficients, and the second field is represented as a second part of the code word having a second plurality of coefficients.

26 Claims, 8 Drawing Sheets

U.S. PATENT DOCUMENTS

| | | | |
|---|---|---|---|
| 6,192,138 B1* | 2/2001 | Yamadaji | 382/100 |
| 6,259,801 B1* | 7/2001 | Wakasu | 382/100 |
| 6,310,962 B1* | 10/2001 | Chung et al. | 382/100 |
| 6,330,335 B1* | 12/2001 | Rhoads | 380/252 |
| 6,341,350 B1* | 1/2002 | Miyahara et al. | 713/176 |
| 6,404,898 B1* | 6/2002 | Rhoads | 382/100 |
| 6,434,253 B1* | 8/2002 | Hayashi et al. | 382/100 |
| 6,456,724 B1* | 9/2002 | Watanabe | 382/100 |
| 6,496,591 B1* | 12/2002 | Rhoads | 382/100 |
| 6,556,689 B1* | 4/2003 | Xia et al. | 382/100 |
| 6,567,535 B2 | 5/2003 | Rhoads | |
| 6,654,887 B2* | 11/2003 | Rhoads | 713/176 |
| 6,683,957 B1* | 1/2004 | Shin | 380/54 |
| 6,700,991 B1* | 3/2004 | Wu et al. | 382/100 |
| 6,798,893 B1* | 9/2004 | Tanaka | 382/100 |
| 6,879,703 B2* | 4/2005 | Lin et al. | 382/100 |
| 6,885,756 B2* | 4/2005 | Kitamura | 713/176 |
| 6,915,000 B1* | 7/2005 | Tanaka | 382/100 |
| 2002/0016616 A1* | 2/2002 | McGraw et al. | 607/51 |
| 2002/0066019 A1* | 5/2002 | Amonou et al. | 713/176 |
| 2003/0033529 A1* | 2/2003 | Ratnakar et al. | 713/176 |

FOREIGN PATENT DOCUMENTS

| | | |
|---|---|---|
| GB | 2 351 409 | 12/2000 |
| JP | 2001-525153 | 12/2001 |
| WO | WO 99/45705 | 9/1999 |
| WO | WO 99/45707 | 9/1999 |
| WO | WO 00 33282 | 6/2000 |
| WO | WO 00/60589 | 10/2000 |

OTHER PUBLICATIONS

Haistma J et al: "A watermarking scheme for digital cinema". Proceedings 2001 International Conference on Image Processing. ICIP 2001. Thessaloniki, Greece, Oct. 7-10, 2001, International Conference on Image Processing, New York, NY: IEEE, US, vol. 1 or 3. Conf. 8, Oct. 7, 2001, pp. 487-489, XP010563804 ISBN: 0-7803-6725-1.

Baitello R et al: "From watermark detection to watermark decoding: a PPM approach". Signal Processing, Amsterdam, NL, vol. 81, No. 6, Jun. 2001, pp. 1261-1271, XP004241226 ISSN: 0165-1684.

Kalker T et al: "A Video Watermarking System for Braodcast Monitoring". Proceedings of the SPIE, SPIE, Bellingham, VA, US, vol. 3657, Jan. 25, 1999, pp. 103-112, XP000949142 ISSN: 0277-786X.

* cited by examiner

WATERMARK 1 (WM1)

| 10 - BIT VALUE | $\rightarrow 2^{10} = 1024$ VALUES

FORM $X' = \{x_0, x_1, x_2, x_3, \ldots x_N\}$ SEED$_{BASE}$

FORM $X'_i = X' \rightarrow i$ $X^1_0$  0  SHIFT OF $X^1$ $X^1_1$  1  SHIFT OF $X^1$ $X^1_2$  2  SHIFT OF $X^1$ $X^1_{1023}$  1023  SHIFT OF $X^1$

WATERMARK 2 (WM2)

| 10 BIT | $\rightarrow 2^{10} = 1024$ VALUES

SHIFT i OF $X^1 \rightarrow$ SEED$_{SUPP}$ FOR WM2 $\rightarrow X^2$ $X^2 = \{x_0, x_1, x_2, x_3, \ldots x_N\}$ SEED$_{SUPP(i)}$ SHIFT OF $X^2_i \rightarrow$ 1024 POSSIBLE VALUES

Fig. 9

DATA PROCESSING APPARATUS AND METHOD

FIELD OF INVENTION

The present invention relates to encoding data processing apparatus and methods, which are arranged to embed code words into versions of material items. In some applications the code words are used to uniquely identify the material items.

Correspondingly, the present invention also relates to data processing apparatus and methods operable to detect one or more code words, which may be present in a material item.

BACKGROUND OF THE INVENTION

A process in which information is embedded in material for the purpose of identifying the material is referred to as watermarking.

Identification code words are applied to versions of material items for the purpose of identifying the version of the material item. Watermarking can provide, therefore, a facility for identifying a recipient of a particular version of the material. As such, if the material is copied or used in a way, which is inconsistent with the wishes of the distributor of the material, the distributor can identify the material version from the identification code word and take appropriate action.

In this description, an item of material, which is copied or used in a way, which is inconsistent with the wishes of the originator, owner, creator or distributor of the material, will be referred to for convenience as an offending item of material or offending material.

The material could be any of video, audio, audio/video material, software programs, digital documents or any type of information bearing material.

For a watermarking scheme to be successful, it should be as difficult as possible for the users to collude in order to mask or remove the identification code words. It should also be as difficult as possible for users to collude to alter the identification code word to the effect that one of the other users is falsely indicated as the perpetrator of an offending item of material. Such an attempt by users to collude to either mask the code word or alter the code word to indicate another user is known as a collusion attack.

Any watermarking scheme should be arranged to make it difficult for users receiving copies of the same material to launch a successful collusion attack. A watermarking scheme should therefore with high probability identify a marked material item, which has been the subject of a collusion attack. This is achieved by identifying a code word recovered from the offending material. Conversely, there should be a low probability of not detecting a code word when a code word is present (false negative probability). In addition the probability of falsely detecting a user as guilty of taking part in a collusion attack, when this user has not taken part, should be as low as possible (false positive probability).

U.S. Pat. Ser. No. 5,664,018 discloses a watermarking process in which a plurality of copies of material items are marked with a digital watermark formed from a code word having a predetermined number of coefficients. The watermarked material item is for example an image. The apparatus for introducing the watermark transforms the image into the Discrete Cosine Transform (DCT) domain. The digital watermark is formed from a set of randomly distributed coefficients having a normal distribution. In the DCT domain each code word coefficient is added to a corresponding one of the DCT coefficients. The watermarked image is formed by performing an inverse DCT. A related publication entitled "Resistance of Digital Watermarks to Collusion Attacks", by J. Kilian, F. T. Leighton et al, published by MIT, Jul. 27, 1998, provides a detailed mathematical analysis of this watermarking process to prove its resistance to attack.

SUMMARY OF THE INVENTION

According to an aspect of the present invention there is provided an encoding data processing apparatus for generating at least one marked copy of an original item of material by introducing one of a predetermined set of code words into a copy of the material item. The apparatus comprises a code word generator operable to provide the code word having a plurality of code word coefficients, and an encoding processor operable to combine the code word coefficients with the material. Each of the plurality of code words of the set is uniquely associated with a data word having first and second fields. Each of a set of values of the first field is represented as a first part of the code word having a first plurality of coefficients, and the second field is represented as a second part of the code word having a second plurality of coefficients.

The present invention provides a facility for generating watermark code words having a hierarchy of values. By providing watermark code words with first and second parts, a data word with first and second fields can be uniquely identified. The first and second fields can be assigned to different associated parameters such as for example address parameters. The first field could therefore identify the country of distribution of the material, whereas the second field could identify a particular distribution outlet within the country.

In preferred embodiments each value of the first field is represented as a predetermined cyclic shift of the first plurality of code word coefficients forming the first part of the code word. In order to implement a practically useful system the number of uniquely identifiable code words in the set should be as high as possible. For a consumer distributed product such as a video or a film for display at a cinema, there should be in the order of a million or preferably tens of millions of code words in the set. As such, it will be appreciated that correlating each of the regenerated code words and the recovered code word to identify the recovered code word and therefore the first and second fields, represents a considerable computational task. Embodiments of the present invention are provided with an advantage with respect to calculating the correlation values for at least the first part of the code words in the set. This is provided by forming at least the first part of the code words of the set by generating a first plurality of code word coefficients and generating other code words by cyclically shifting the first plurality of code word coefficients. As such, the correlation values for all first parts of the code, words of the set can be calculated using a Fourier transform correlator. As will be explained, the Fourier transform correlator provides the correlation values for the set in one operation, substantially reducing the computational task.

The second plurality of coefficients of the second part of the code word may be derived from pseudo-random numbers generated by a pseudo-random number generator using one of a plurality of supplementary seeds. The supplementary seed for generating the second part of the code word may be identified by the value of the first field or correspondingly the relative shift of the first plurality of coefficients. Each of the values of the second data field is represented as a corresponding shift of the second plurality of coefficients. By forming the watermark from first and second parts, a hierarchy of data words can be defined. Furthermore, the code words, which are defined by each data word, are provided with improved robustness to a collusion attack and can be efficiently detected using a Fourier transform correlator.

In preferred embodiments, the encoding processor is operable to permute the order in which at least one of the first and second code word coefficients are combined with the material in accordance with a permutation code. Correspondingly, in preferred embodiments the detecting data processor is arranged to reverse the permutation of either the re-generated first and/or second code word coefficients or the recovered first and/or second code word coefficients in order to perform the correlation values. Permuting the code word coefficients provides an advantage of reducing the likelihood of a successful collusion attack, which may increase by forming the code words from cyclically shifting the first code word.

According to an aspect of the present invention there is provided a detecting data processing apparatus as defined in the appended claims. As will be explained, example embodiments of the invention are arranged to identify the first and second field values from the first and second parts of the watermark. Advantageously, this is achieved by forming a correlation of the first plurality of coefficients from a recovered version of the code word with respect to the first part of each of the code words of the set. This correlation is achieved using a Fourier transform correlator. The first field value is determined by a correlation value produced by the Fourier transform correlator which indicates the shift of the first plurality of code word coefficients. The first field then identifies a supplementary seed from which the second plurality of code word coefficients, forming the second part of the watermark, were generated. By again using a Fourier transform correlator, the value of the second field can be identified from correlation values indicating the shift of the second plurality of code word coefficients.

Various further aspects and features of the present invention are defined in the appended claims.

BRIEF DESCRIPTION OF DRAWINGS

Embodiments of the present invention will now be described by way of example only with reference to the accompanying drawings, where like parts are provided with corresponding reference numerals, and in which:

FIG. 9 is a schematic representation illustrating a process of forming code words having at least two parts.

DESCRIPTION OF PREFERRED EMBODIMENTS

Watermarking System Overview

An example embodiment of the present invention will now be described with reference to protecting video images. The number of users to which the video images are to be distributed determines the number of copies. To each copy an identification code word is added which identifies the copy assigned to one of the users.

Video images are one example of material, which can be protected by embedding a digital code word. Other examples of material, which can be protected by embedding a code word, include software programs, digital documents, music, audio signals and any other information-bearing signal.

Figure 1:
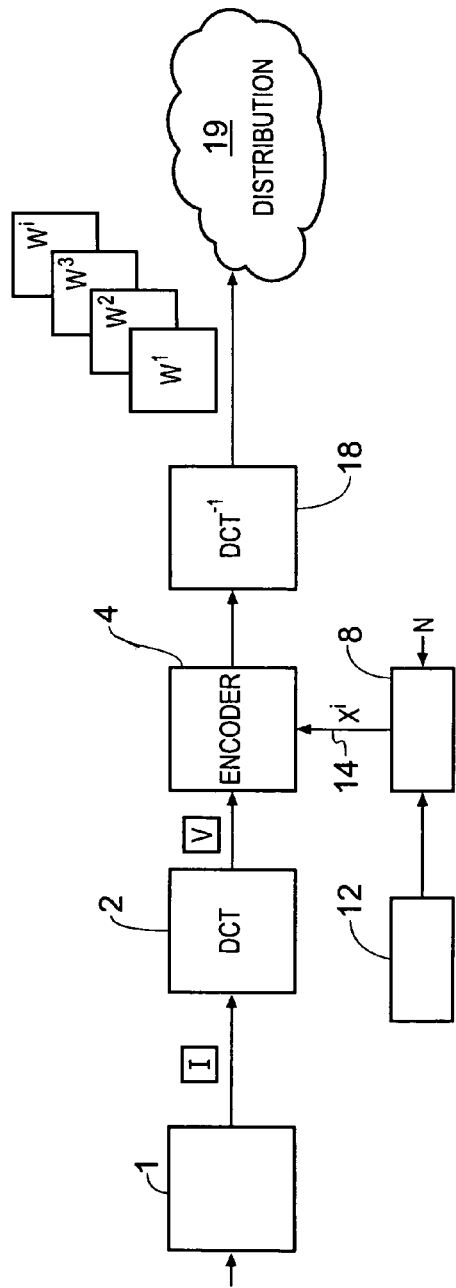
FIG. 1 is a schematic block diagram of an encoding image processing apparatus.

An example of an encoding image processing apparatus, which is arranged to introduce an identification code word into a copy of an original image, is shown in FIG. 1. An original image I is received from a source and stored in a frame store 1. This original image is to be reproduced as a plurality of water marked copies, each of which is marked with a uniquely identifiable code word. The original image is passed to a Discrete Cosine Transform (DCT) processor 2, which divides the image into 8×8 pixel blocks and forms a DCT of each of the 8×8 pixel blocks. The DCT processor 2 therefore forms a DCT transformed image V.

In the following description the term "samples" will be used to refer to discrete samples from which an image (or indeed any other type of material) is comprised. The samples may be luminance samples of the image, which is otherwise, produce from the image pixels. Therefore, where appropriate the terms samples and pixels are inter-changeable.

The DCT image V is fed to an encoding processor 4. The encoding processor 4 also receives identification code words from an identification code word generator 8.

The code word generator 8 is provided with a plurality of seeds, each seed being used to generate one of the corresponding code words. Each of the generated code words may be embedded in a copy of the original image to form a watermarked image. The code word generator 8 is provided with a pseudo random number generator. The pseudo random number generator produces the code word coefficients to form a particular code word. In preferred embodiments the coefficients of the code words are generated in accordance with a normal distribution. However, the coefficients of the code word are otherwise predetermined in accordance with the seed, which is used to initialise the random number generator. Thus for each code word there is a corresponding seed which is store in a data store 12. Therefore it will be understood that to generate the code word $X^i$, $seed_i$ is retrieved from memory 12 and used to initialise the random number generator within the code word generator 8.

In the following description the DCT version of the original image is represented as V, where;

$$V = \{v_i\} = \{v_1, v_2, v_3, v_4, \ldots v_N\}$$

and $v_i$ are the DCT coefficients of the image. In other embodiments the samples of the image $v_i$ could represent samples of the image in the spatial domain or in an alternative domain.

Each of the code words $X^i$ comprises a plurality of n code word coefficients, where;

$$X^i = \{x_j^i\} = \{x_1^i, x_2^i, x_3^i, x_4^i, \ldots x_n^i\}$$

The number of code word coefficients n corresponds to the number or samples of the original image V. However, a different number of coefficients is possible, and will be set in dependence upon a particular application.

A vector of code word coefficients $X^i$ forming the i-th code word is then passed via channel 14 to the encoder 4. The encoder 4 is arranged to form a watermarked image $W^i$ by adding the code word $X^i$ to the image V. Effectively, therefore, as represented in the equation below, each of the code word coefficients is added to a different one of the coefficients of the image to form the watermark image $W^i$.

$$W^i = V + X^i$$

$$W^i = v_1 + x_1^i, v_2 + x_2^i, v_3 + x_3^i, v_4 + x_4^i, \ldots, v_n + x_n^i$$

As shown in FIG. 1, the watermarked images $W^i$ are formed at the output of the image processing apparatus by an forming inverse DCT of the image produced at the output of the encoding processor 4 by the inverse DCT processor 18.

Therefore as represented in FIG. 1 at the output of the encoder 4 a set of the watermarked images can be produced. For a data word of up to 20-bits, one of 10 000 000 code words can be selected to generate 10 million watermarked $W^i$ versions of the original image I.

Although the code word provides the facility for uniquely identifying a marked copy $W^i$ of the image I, in other embodiments the 20 bits can provide a facility for communicating data within the image. As will be appreciated therefore, the 20 bits used to select the identification code word can provide a 20 bit pay-load for communicating data within the image V.

The encoding image processing apparatus which is arranged to produce the watermarked images shown in FIG. 1 may be incorporated into a variety of products for different scenarios in which embodiments of the present invention find application. For example, the encoding image processing apparatus may be connected to a web site or web server from which the watermarked images may be downloaded. Before downloading a copy of the image, a unique code word is introduced into the downloaded image, which can be used to detect the recipient of the downloaded image at some later point in time.

In another application the encoding image processor forms part of a digital cinema projector in which the identification code word is added during projection of the image at, for example, a cinema. Thus, the code word is arranged to identify the projector and the cinema at which the images are being reproduced. Accordingly, the identification code word can be identified within a pirate copy produced from the images projected by the cinema projector in order to identify the projector and the cinema from which pirate copies were produced. Correspondingly, a watermarked image may be reproduced as a photograph or printout in which a reproduction or copy may be made and distributed. Generally therefore, the distribution of the watermarked images produced by the encoding image processing apparatus shown in FIG. 1 is represented by a distribution cloud 19.

Detecting Processor

Figure 2:
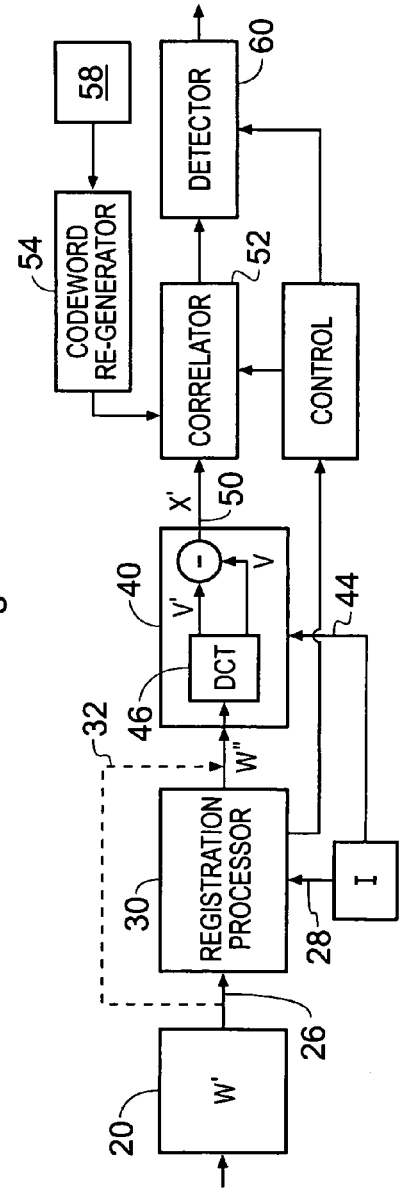
FIG. 2 is a schematic block diagram of a detecting image processing apparatus.

A detecting image processing apparatus which is arranged to detect one or more of the code words, which may be present in an offending marked image is shown in FIG. 2. Generally, the image processor shown in FIG. 2 operates to identify one or more of the code words, which may be present in an offending copy of the image.

The offending version of the watermarked image W' is received from a source and stored in a frame store 20. Also stored in the frame store 24 is the original version of the image I, since the detection process performed by the image processor requires the original version of the image. The offending watermarked image W' and the original version of the image are then fed via connecting channels 26, 28 to a registration processor 30.

As already explained, the offending version of the image W' may have been produced by photographing or otherwise reproducing a part of the watermarked image $W^i$. As such, in order to improve the likelihood of detecting the identification code word, the registration processor 30 is arranged to substantially align the offending image with the original version of the image present in the data stores 20 and 24. The purpose of this alignment is to provide a correspondence between the original image samples I and the corresponding samples of the watermarked image $W^i$ to which the code word coefficients have been added.

Figure 3:
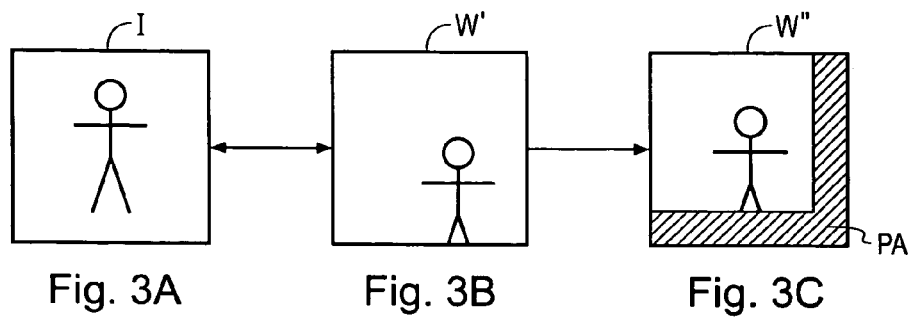
FIG. 3A is a representation of an original image.
FIG. 3B is a representation of a marked image and FIG. 3C is the marked image after registration.

The effects of the registration are illustrated in FIG. 3. In FIG. 3 an example of the original image I is shown with respect to an offending marked version of the image W' As illustrated in FIG. 3, the watermarked image W' is offset with respect to the original image I and this may be due to the relative aspect view of the camera from which the offending version of the watermarked image was produced.

In order to recover a representation of the code word coefficients, the correct samples of the original image should be subtracted from the corresponding samples of the marked offending image. To this end, the two images are aligned. As shown in FIG. 3, the registered image W''' has a peripheral area PA which includes parts which were not present in the original image.

As will be appreciated in other embodiments, the registration processor 30 may not be used because the offending image W' may be already substantially aligned to the originally version of the image I, such as, for example, if the offending version was downloaded via the Internet. Accordingly, the detecting image processor is provided with an alternative channel 32, which communicates the marked image directly to the recovery processor 40.

The registered image W''' is received by a recovery processor 40. The recovery processor 40 also receives a copy of the original image I via a second channel 44. The registered image W''' and the original image I are transformed by a DCT transform processor 46 into the DCT domain. An estimated code word X' is then formed by subtracting the samples of the DCT domain marked image V' from the DCT domain samples of the original image V as expressed by the following equations:

$$X' = V' - V$$

-continued $$= v'_1 - v_1, v'_2 - v_2, v'_3 - v_3, v'_4 - v_4, \ldots, v'_n - v_n,$$

$$= x'_1, x'_2, x'_3, x'_4, \ldots x'_n$$

The output of the recovery processor 40 therefore provides on a connecting channel 50 an estimate of the coefficients of the code word which is to be identified. The recovered code word X' is then fed to a first input of a correlator 52. The correlator 52 also receives on a second input the regenerated code words $X^i$ produced by the code word generator 54. The code word generator 54 operates in the same way as the code word generator 8 which produces all possible code words of the set, using the predetermined seeds which identify uniquely the code words from a store 58.

The correlator 52 forms n similarity sim(i) values. In one embodiment, the similarity value is produced by forming a correlation in accordance with following equation:

$$sim(i) = \frac{X^i \cdot X'}{\sqrt{X^i \cdot X'}} = \frac{x^i_1 \cdot x'_1 + x^i_2 \cdot x'_2 + x^i_3 \cdot x'_3 + \ldots + x^i_n \cdot x'_n}{\sqrt{x^i_1 \cdot x'_1 + x^i_2 \cdot x'_2 + x^i_3 \cdot x'_3 + \ldots + x^i_n \cdot x'}}$$

Figure 4:
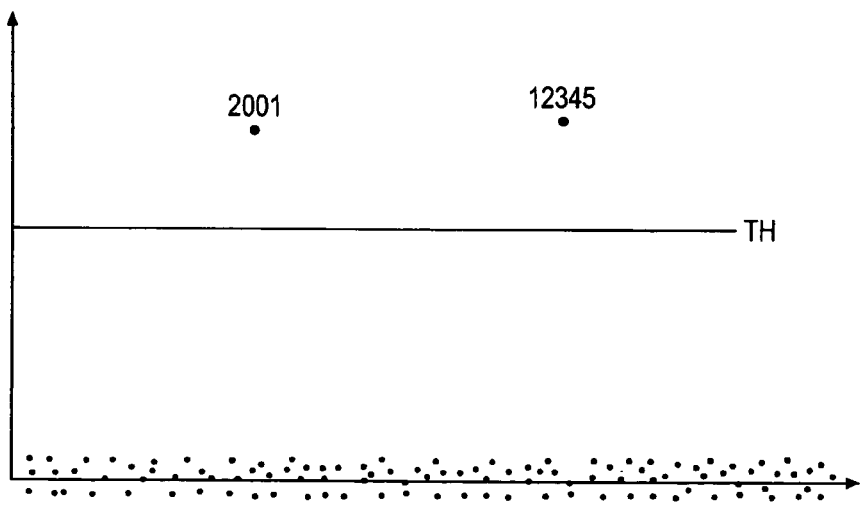
FIG. 4 is a graphical representation of an example correlation result for each of a set of code words N.

Each of the n similarity values sim(i) is then fed to a detector 60. The detector 60 then analyses the similarity values sim(i) produced for each of the n possible code words. As an example, the similarity values produced by the correlator 52 are shown in FIG. 4 with respect to a threshold TH for each of the possible code words. As shown in FIG. 4, two code words are above the threshold, 2001, 12345. As such, the detecting processor concludes that the watermarked version associated with code word 2001 and code word 12345 must have colluded in order to form the offending image. Therefore, in accordance with a false positive detection probability, determined from the population size, which in this case is 10 million and the watermarking strength α, the height of the threshold TH can be set in order to guarantee the false detection probability. As in the example in FIG. 4, if the similarity values produced by the correlator 52 exceed the threshold then, with this false positive probability, the recipients of the marked image are considered to have colluded to form the offending watermarked version of the image $W^i$.

The following sections illustrate advantages and features of the operation of the watermarking system illustrated in FIGS. 1 and 2.

Registration

The process of aligning the offending marked version of the image with the copy of the original image comprises correlating the samples of the original image with respect to the marked image. The correlation is performed for different shifts of the respective samples of the images. This is illustrated in FIG. 5.

Figure 5A:
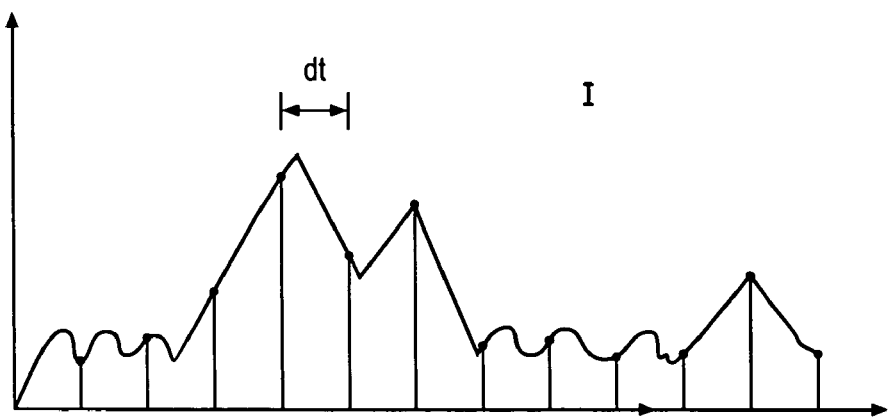
FIG. 5A is a graphical representation of samples of the original image I.
Figure 5B:
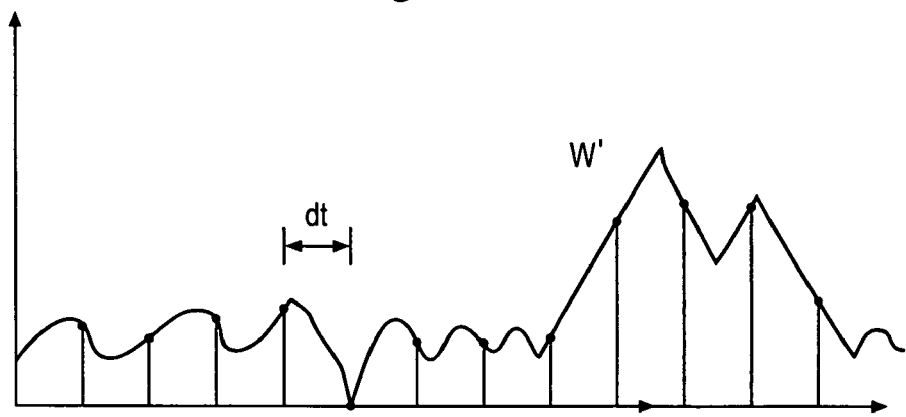
FIG. 5B is a graphical representation of samples of the watermarked image W'.

FIG. 5A provides an illustration of discrete samples of the original image I, whereas FIG. 5B provides an illustration of discrete samples of the offending watermarked image W' As illustrated in the FIGS. 5A and 5B, the sampling rate provides a temporal difference between samples of dt. A result of shifting each of the sets of samples from the images and correlating the discrete samples is illustrated in FIG. 5C.

Figure 5C:
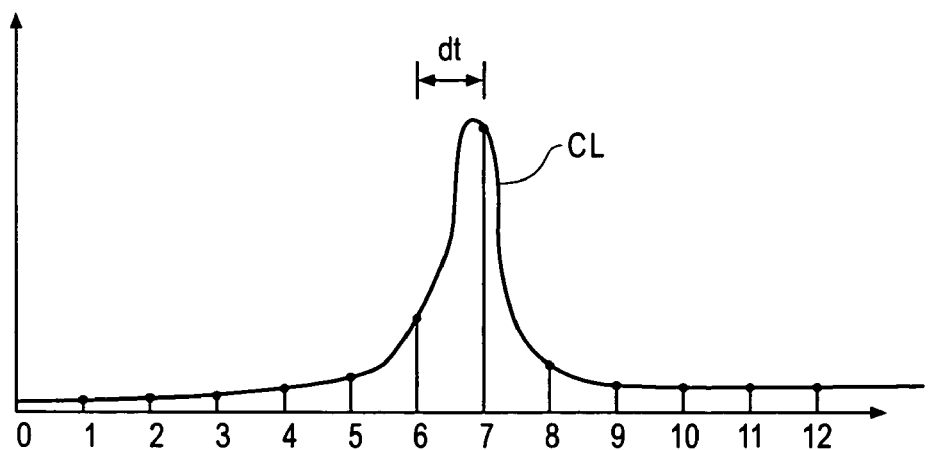
FIG. 5C is a graphical representation of correlation results for the original image and the watermarked image with respect to discrete sample shifts.

As shown in FIG. 5C, for a shift of between 6 and 7 samples, the correlation peak is highest. The offending watermarked image is therefore shifted by this amount with respect to the original image to perform registration.

Fourier Decoding

As explained, with reference to FIGS. 1 and 2, the watermarking system can provide a facility for generating 10 million watermarked versions of an original image. This is effected using a 20-bit watermark value. However, as explained, in order to detect the presence of one of the code words in an offending watermarked image, the detecting image processor must correlate each of the possible code words in the set of 10 million code words with respect to a recovered code word from the image. As will be appreciated, this represents a considerable computational task.

Figure 6:
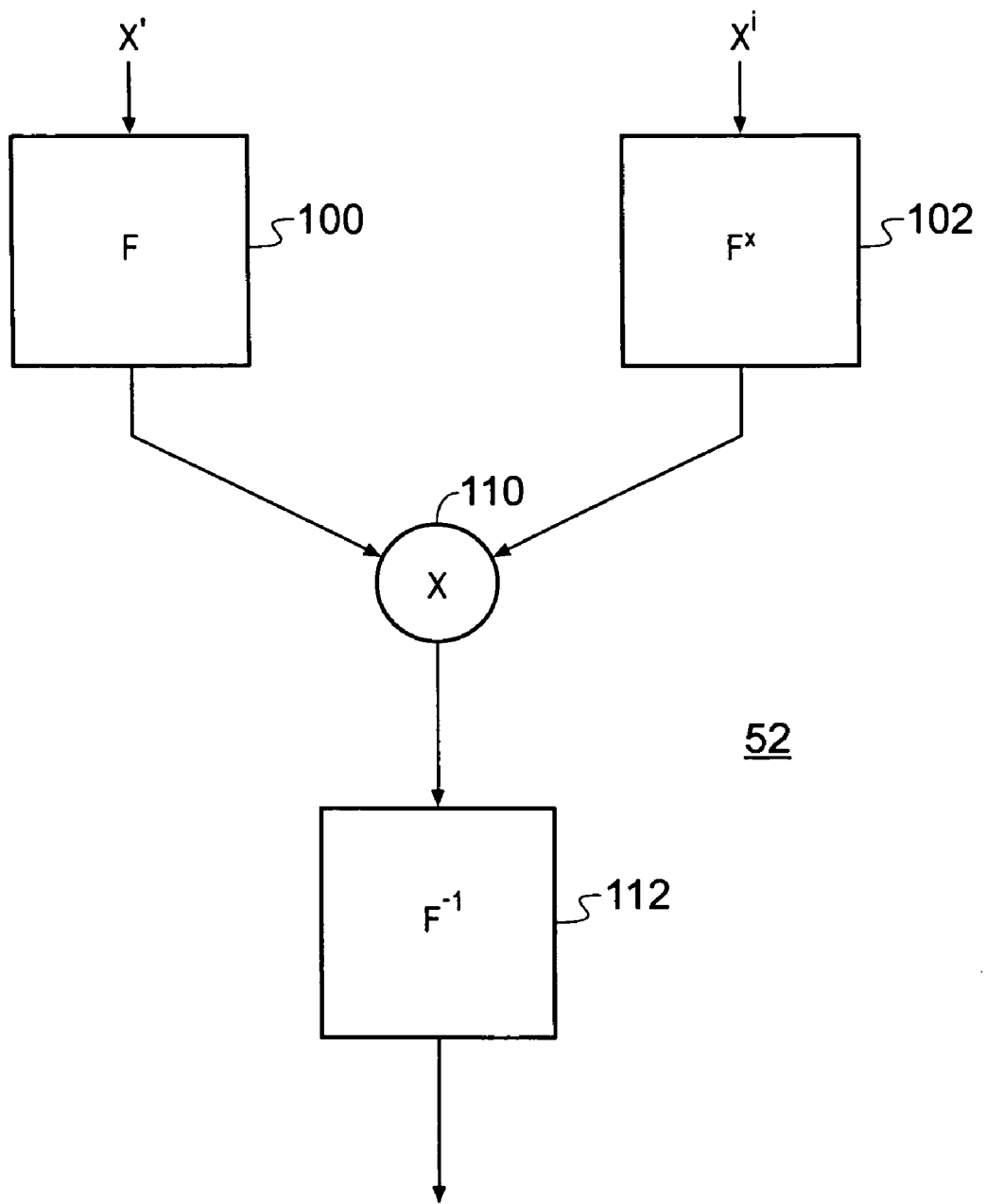
FIG. 6 is a schematic block diagram of a correlator forming part of the detecting data processing apparatus shown in FIG. 2.

A correlator embodying the present invention provides a significant advantage in reducing the computational effort and therefore the time taken to detect the presence of a code word in an offending watermarked image. A correlator in accordance with the embodiment of the present invention is illustrated in FIG. 6. The correlator shown in FIG. 6 takes advantage of an alternative technique for calculating the correlation sum shown above. In accordance with this technique the correlation sum is calculated in accordance with the following equation:

$$F^{-1}[F(X')F(X^{(1)})^*]$$

where F(A) is the Fourier transform of A and $F^{-1}$ (A) is the inverse Fourier transform of A.

Figure 7:
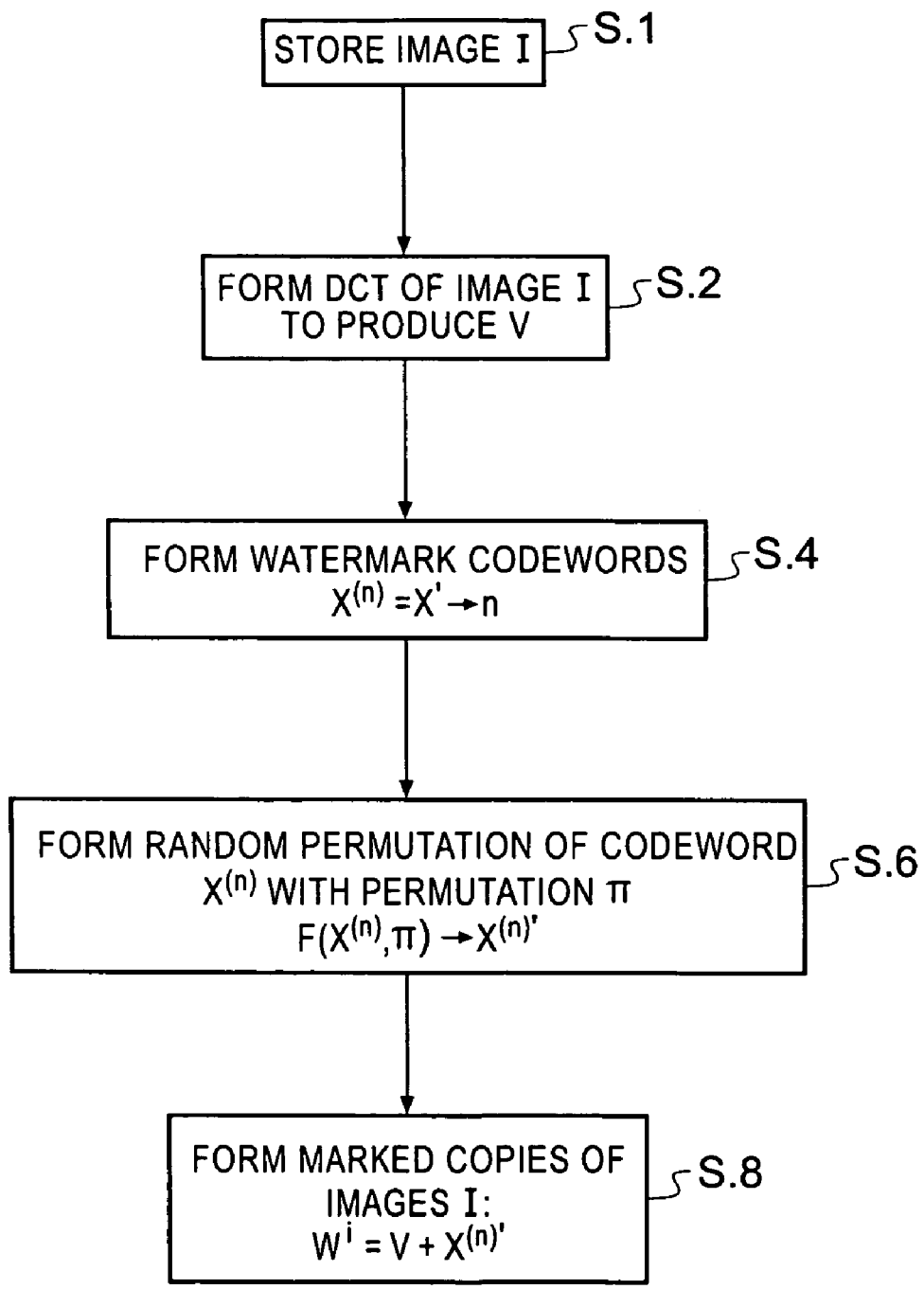
FIG. 7 is a flow diagram of a process for forming watermarked images performed by the encoding image data processor.

The corrolator 52 shown in FIG. 7 therefore comprises a first Fourier transform processor 100, and a second Fourier transform processor 102. Fourier transform processors 100, 102 may be implemented using Fast Fourier transform algorithms. The second Fourier transform processor 102 also forms the complex conjugate of the Fourier transform of the regenerated code word $X^1$. The Fourier transform of the recovered code word X' and the complex conjugate of the Fourier transform of the regenerated code word $X^i$ are fed to first and seconds inputs of a multiplier 110. The multiplier 110 multiplies the respective samples from each of the Fourier transform processors 100, 102 and feeds the multiplied samples to an inverse Fourier transform processor 112. At the output of the correlator an inverse Fourier transform of the multiplied signals samples is formed.

As will be appreciated, the implementation of the corrrelator 52 shown in FIG. 6 provides an advantage in terms of time taken to compute the correlation for the n sample values of the regenerated code word $X^i$ and the recovered code word X'. This is because the Fourier processors 100, 102, 112 can be formed from FFT integrated circuits such as, for example, are available as ASICS. Furthermore, the inverse Fourier transform provided at the output of the corrolator 52 provides n similarity values sim(i) corresponding to n correlation sums. However, in order to utilise the properties of the corrolator 52, shown in FIG. 6 the code words are arranged to be generated by cyclically shifting one code word generated $X^{(1)}$ using a particular seed for the random number generator. This is illustrated below. As shown below, the first code word $X^{(1)}$ is represented as values $x_1$ to $x_n$, which corresponds to the pseudo randomly produced numbers from the code word generator 8. However, the second code word $X^{(2)}$ is produced by performing a cyclic shift on the first code word $X^{(1)}$. Correspondingly, each of the other code words are produced by correspondingly cyclically shifting further the code word $X^{(1)}$ until the n-th code word is a code word shifted by n−1 positions.

$$X^{(1)} \to (x_1, x_2, x_3, x_4, \ldots, x_{n-1}, x_n)$$

$X^{(2)} \to (x_2, x_3, x_4, \ldots, x_{n-1}, x_n, x_1)$ $X^{(3)} \to (x_3, x_4, \ldots, x_{n-1}, x_n, x_1, x_2)$ $X^{(n)} \to (x_n, x_1, x_2, x^3, x_4, \ldots x_{n-2}, x_{n-1})$ By using this set of code words to form part of, or the whole of, the set of code words produced by the encoding image processor, the Fourier transform correlator 52 can be used to generate in one operation all similarity values for all of the n code words. Therefore, as illustrated above, the corresponding shift of 1 to n of the original code word provides the n similarity values sim(i), and as illustrated in FIG. 4, for at least one of the code words, a large similarity value sim(i) is produced. Therefore, as will be appreciated the correlator 52 only receives one regenerated code word corresponding to first code word $X^{(1)}$ to form the similarity values for the set of n code words as illustrated in FIG. 4.

As will be appreciated from the above explanation, if the code word contains N samples, then only N unique cyclic shifts are possible. Therefore, if the required population of code words is p, which is greater than N, then several base watermarks will be required. Each base watermark can be cyclically shifted to produce N unique code words.

If the watermarked image forms one of a plurality of images in, for example, a video sequence, then the same code word will be added to each of the images. As such, once the suspected code word has been identified using the Fourier transform corrolator illustrated in FIG. 6, then a subsequent correlation can be formed using the full correlation sum sim(i) as explained above. However, because the suspected code word has already been identified, then the correlation only needs to be performed once for the code word identified by the Fourier transform correlator shown in FIG. 6.

As will be appreciated, instead of forming the conjugate of the Fourier transform of the regenerated first code word $X^1$, the conjugate of the Fourier transform of the recovered code word could be formed. This is expressed by the second alternative of the Fourier transform correlator shown below:

$$F^{-1}[F(X')^* F(X^{(1)})]$$

Accordingly the conjugate of one of the Fourier transform of the recovered code word and the Fourier transform of the regenerated code word is formed by the Fourier transform processors 100, 102.

Secret Permutation of Code Words

One disadvantage of forming a code word from a cyclic shift of a first code word $X^1$ is that the security of the watermark may be compromised. This is because under a collusion attack two watermarked images are compared. If the same code word has been added to each image, with only a cyclic shift with respect to two versions of the same code word, an attacker may be more likely to identify the differences between the two marked material items and therefore identify the code word. With knowledge of the code word an attacker may either remove the watermark or alter the watermark to falsely implicate another.

In order to reduce the likelihood of a successful collusion attack, the order of each of the code word coefficients of each of the cyclically shifted code words is randomly permuted in accordance with a secret permutation code π. The permutation of the code word coefficients remains secret from the recipients of the marked images. Accordingly the likelihood of a successful collusion attack is reduced by an increase in the difficulty presented to a collusion attacker of identifying a correlation between two marked images.

Figure 8:
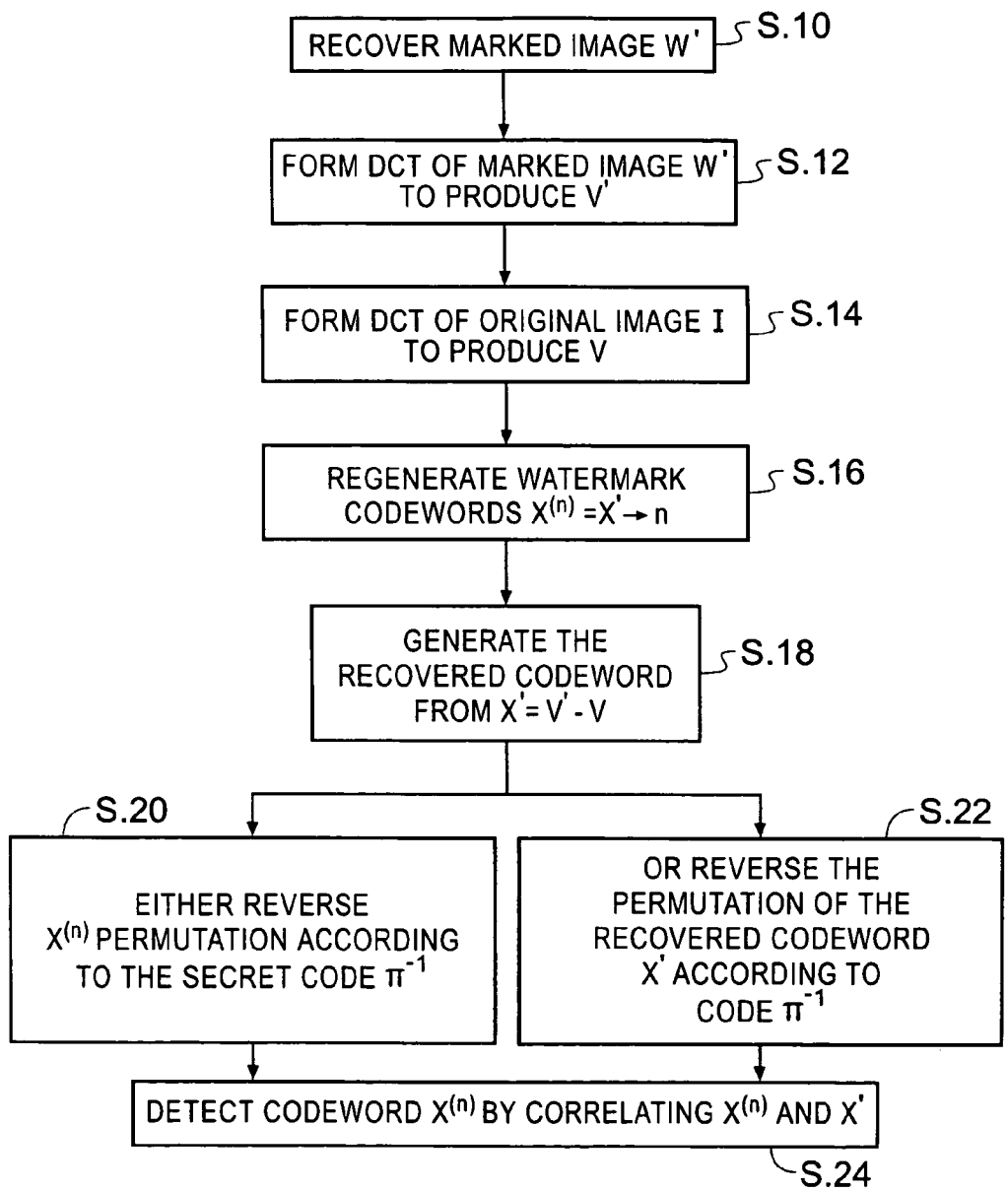
FIG. 8 is a flow diagram of a process for identifying a watermark from a received marked copy of the image performed by the detecting data processor of FIG. 2.

At the detecting data processor the secret permutation code π will be known. In the detecting data processor, either the code word re-generator or the recovery processor 40 is operable to reverse the permutation $\pi^{-1}$ of either the re-generated code word coefficients or the recovered code word coefficients in order to perform the correlation. The operation of the encoding data processor of FIG. 1 and the detecting data processor of FIG. 2 is therefore as presented in a flow diagrams in FIGS. 7 and 8 respectively.

Watermark Code Word Generation

Figure 10:
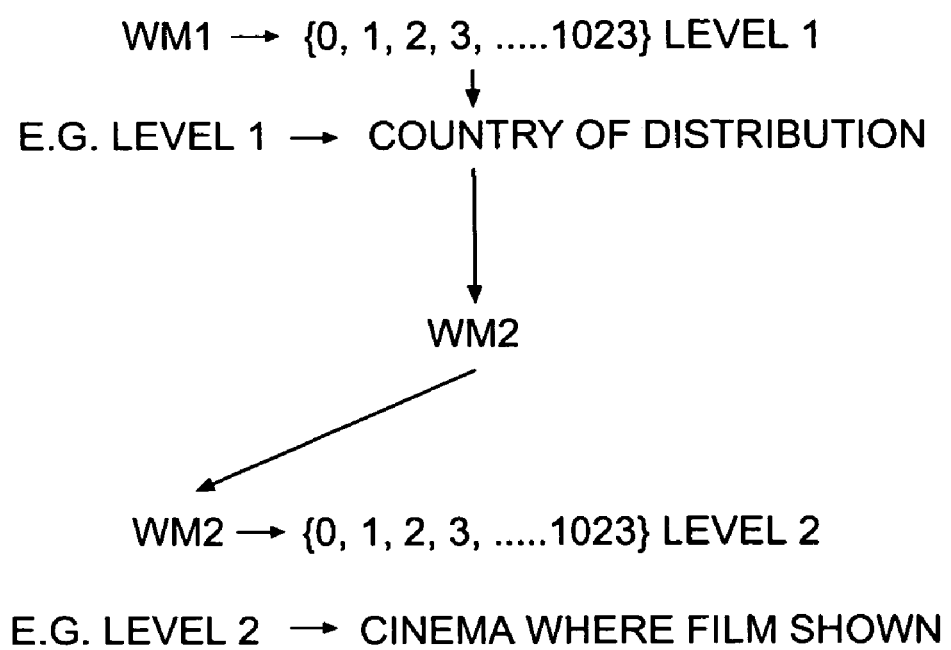
FIG. 10 is a schematic representation illustrating the use of the code word with two parts formed in FIG. 9 to provide a hierarchical information.

An improved implementation of watermark code word generation in accordance with an embodiment of the present invention will now be described with reference to FIGS. 9 and 10. As already explained, one of the advantages of generating code words by cyclically shifting a code word is that the Fourier transform correlator can be used to perform an efficient detector for the presence of a watermark code word in a marked material item.

As explained above, one disadvantage of generating code words from cyclically shifting a first code word $X^1$ is an increased vulnerability to collusion attack. As explained above, this vulnerability can be reduced by permuting the code word coefficients in accordance with a secret permutation code.

In order to reduce further the likelihood of a successful collusion attack, the code word generator performing part of the encoding image processor in preferred embodiments generates watermark code words having a plurality of differently generated parts. As will be explained, providing code words with a plurality of parts also provides a facility for generating a hierarchy of watermarks. As an illustration, a 20-bit code word is considered. The 20-bit code word provides over one million (1,048,576) possible data values.

In an illustrative embodiment the 20-bit code word is split into two 10-bit parts. This is shown in FIG. 9. The first 10-bits are used to generate a first part of the watermark WM1. The second 10-bits are used to generate a second part of the watermark WM2. WM1 and WM2 are then embedded in the image to be watermarked as already explained.

In preferred embodiments WM1 may be formed by generating a single code word comprising first code word coefficients produced by the pseudo random number generator forming part of the code word generator 8. These numbers are generated from a base seed $SEED_{base}$ as illustrated in FIG. 9. The base seed may be generated from samples of the source image.

For the first 10-bits of WM1 each of the 1024 possible data values are represented by 1024 possible shifts of the first part of the code word WM1 generated from the base seed. As illustrated in FIG. 9 the shifts comprise 0 to 1023 possible values.

The second part of the watermark WM2 is generated in dependence upon the first part of the watermark WM1. The shift applied to WM1 is mapped onto one of 1024 possible supplementary seeds. Therefore the i-th shift of the code word $X^1 \to i = X_i^1$ identifies a unique supplementary seed ($seed_i$). From the supplementary seed a further code word is generated labelled in FIG. 9 as $X^2$. Thus there is a unique pre-determined relationship between the shift of the first code word $X_i^1$ forming WM1 and the seed used to form the second code word $X_i^2$ for WM2. However, in order to represent the further 1024 possible values, the second watermark WM2 is shifted in accordance with the 10-bit value for WM2. As shown in FIG. 10, this provides a hierarchy of values. The first 1024 values provided by WM1 provides an indication of the code word forming WM2. The possible shifts of the code word formed from WM2 then provides a second set of 1024 values for a hierarchy of level two.

Embodiments of the present invention provide a facility for identifying watermarked images on the basis of plurality of hierarchies. For example, the WM1 can be used to identify the country, state or part of the state in which the images are distributed. The second level of the hierarchy can be used to identify a second part of the state, for example a town or cinema at which the watermarked images are reproduced. It will be appreciated that this can provide a facility for more quickly and more accurately identifying the location where the watermarked images were reproduced and from which offending copies were made.

A further advantage of generating code words having two parts WM1, WM2, is that the Fourier transform decoder shown in FIG. 6 can be used to efficiently identify which of the 1024 values are present in each of the two hierarchical levels. In combination, since the second part of the watermark WM2 is formed from 1024 possible shifts of the second code word a further Fourier transform decoding can then be used to identify the possible shift of the second part of the code word WM2.

Forming the watermark code words having two related parts also provides an improvement in reducing the likelihood of a successful collusion attack. As explained above either or both code word parts may be permuted before being combined with the image.

Other Applications

In addition to the above-mentioned applications of the encoding data processing apparatus of the watermarking system to a cinema projector and to a web server, other applications are envisaged. For example, a receiver/decoder is envisaged in which received signals are watermarked by introducing code words upon receipt of the signals from a communicating device. For example, a set top box is typically arranged to receive television and video signals from a "head-end" broadcast or multi-cast device. As will be appreciated in this application, the encoding data processing apparatus forms part of the set top box and is arranged to introduce watermark code words into the video signals as the signals are received and decoded. In one example embodiment, the watermark code word is arranged to uniquely identify the set top box which receives and decodes the video signals.

In a further embodiment a digital cinema receiver is arranged to receive a digital cinema film via a satellite. The receiver is arranged to receive signals representing the digital cinema film and to decode the signals for reproduction. The receiver includes an encoding data processing apparatus, which introduces a watermark code word into the decoded film signals. The watermark code word is provided, for example, to uniquely identify the cinema receiving the film signals.

A further example embodiment may comprise a digital camera or camcorder or the like which includes a memory and a memory controller. An encoding data processing apparatus according to an embodiment of the present invention is arranged to introduce a watermark code word stored in the memory into video signals captured by the camera. According to this embodiment, the encoding data processing apparatus does not include a code word generator because the code word is pre-stored in the memory. Under the control of the memory controller the code word stored in the memory is embedded into the video signals, uniquely or quasi-uniquely identifying the video signals.

In a further embodiment, an encoding data processing apparatus according to an embodiment of the invention is operable to encode a sequence of watermark code words into different frames of digital images forming a continuous or moving picture. The code words may be related to one another and may be used to identify each of the images separately.

Various further aspects and features of the present invention are defined in the appended claims. Various modifications can be made to the embodiments herein before described without departing from the scope of the present invention.

The invention claimed is:

1. An encoding data processing apparatus for generating at least one marked copy of an original item of material by introducing one of a predetermined set of code words into a copy of said material item, said apparatus comprising
   a code word generator operable to provide said code word having a plurality of code word coefficients; and
   an encoding processor operable to combine the code word coefficients with said material, wherein
   each of said plurality of code words of said set is uniquely associated with a data word having first and second fields, each of a set of values of said first field being represented as a first part of said code word having a first plurality of coefficients, and said second field is represented as a second part of said code word having a second plurality of coefficients.

2. An encoding data processing apparatus as claimed in claim 1, wherein each value of said first field is represented as a predetermined cyclic shift of said first plurality of code word coefficients of said first part of said code word.

3. An encoding data processing apparatus as claimed in claim 2, wherein said code word generator includes a pseudo-random number generator operable to generate pseudo-random numbers from which said first part of said code word is derived, said value of the first field defining a predetermined cyclic shift of said first code word coefficients.

4. An encoding data processing apparatus as claimed in claim 1, wherein said second plurality of coefficients of said second part of said code word are derived from pseudo-random numbers generated using one of a plurality of supplementary seeds identified by said value of said first field, each of the values of said second data field being represented as a corresponding shift of said second plurality of coefficients.

5. An encoding data processing apparatus as claimed in claim 1, wherein said code word generator is operable to generate a first seed value for generating said first plurality of code word coefficients from samples of said material item.

6. An encoding processor as claimed in claim 1, wherein said encoding processor is operable to permute at least one of said first plurality of code word coefficients and said second plurality of code word coefficients in accordance with a permutation code.

7. An encoding data processing apparatus as claimed in claim 1, comprising
   a discrete cosine transform processor operable to transform said material item into the discrete cosine transform domain, said material item in said discrete cosine transform domain being represented as a plurality of discrete cosine transform coefficients, wherein said encoding processor is operable to combine said code word with said material item by adding each of said first and second code word coefficients to a corresponding one of said discrete cosine transform coefficients; and an inverse discrete cosine transform processor operable to form said marked copy of said material item by performing an inverse discrete cosine transform on said discrete cosine transformed image to which said code word has been added by said encoding processor.

8. A cinema projector including an encoding data processing apparatus according to claim 1, wherein said data processing apparatus is operable to receive at least one of audio signals and image signals before reproduction, and to introduce a code word into said at least one of audio signals and image signals before reproduction.

9. A web server operable to provide material items for downloading via the Internet, said web server including an encoding data processing apparatus according to claim 1, wherein said data processing apparatus is operable to receive material items and to introduce a code word into said material items before said material items are downloaded.

10. A detecting data processing apparatus operable to identify at least one of set of code words present in a marked version of an item of material, said marked version having been formed by combining each of a plurality of samples of an original version of said material item with one of a corresponding plurality of code word coefficients, each code word being uniquely associated with a data word having first and second fields, each of a set of values of said first field being represented as a first part of said code word having a first plurality of coefficients, and said second field being represented as a second part of said code word having a second plurality of coefficients, and each value of said first field being represented as a predetermined cyclic shift of said first plurality of code word coefficients of said first part of said code word, said detecting data processing apparatus comprising a decoding processor operable to generate a recovered code word from said marked material item; and a detection processor operable to detect at least one first data field value and at least one second data field value by correlating the first part of the recovered code word with a first part of each regenerated code word from the set of code words to generate a correlation value for each regenerated code word, detecting the value of the first field value from a corresponding correlation value exceeding a predetermined threshold, correlating the second part of the recovered code word with a second part of each regenerated code word from the set of code words to generate a second correlation value for each regenerated code word; and detecting the value of the second field value from a corresponding second correlation value exceeding a predetermined threshold.

11. A detecting data processing apparatus as claimed in claim 10, wherein said detection processor is operable to form said correlation value for said first part of said recovered code word and the first part of each of said regenerated code words by forming a Fourier transform of a part corresponding to the first part of said recovered code word, forming a Fourier transform of said first plurality of code word coefficients of the first part of the regenerated code word, forming the complex conjugate of one of the Fourier transform of the first part of the recovered code word and the Fourier transform of the first part of the regenerated code word, forming intermediate product samples by multiplying each of said Fourier transform samples of said first part of said recovered code word and the corresponding Fourier transform samples of said first part of said regenerated code word; and forming correlation samples for the first part of the recovered code word by an inverse transform of said intermediate product samples, each of said correlation value samples providing the correlation value for the first part of said code words.

12. A detecting data processing apparatus as claimed in claim 10, wherein said second plurality of coefficients of said second part of said code word are derived from pseudo-random numbers generated from one of a plurality of supplementary seeds identified by said value of said first field, each of the values of said second data field being represented as a corresponding shift of said second plurality of coefficients, wherein said decoding processor is operable to identify a supplementary seed from the set of supplementary seeds, indicated from said first field value detected from said correlation values; and said detection processor is operable to regenerate said second plurality of code word coefficients from said identified supplementary seed and to identify the value of said second data field from a shift of said second code word coefficients with respect to said second part of said recovered code word.

13. A detecting data processing apparatus as claimed in claim 12, wherein said detection processor is operable to identify the value of the shift of said regenerated second plurality of coefficients with respect to said second part of said recovered code word by correlating said regenerated second plurality of coefficients with said second part of said recovered code word.

14. A detecting data processing apparatus as claimed in claim 13, wherein said detection processor is operable to correlate said regenerated second plurality of coefficients with said second part of said recovered code word by forming a Fourier transform of the second part of said recovered code word, forming a Fourier transform of said second plurality of code word coefficients of the second part of the regenerated code word, forming the complex conjugate of one of the Fourier transform of the second part of the recovered code word and the Fourier transform of the second part of regenerated code word, forming intermediate product samples by multiplying each of said Fourier transform samples of said second part of said recovered code word and the corresponding Fourier transform samples of said regenerated second code word part, forming correlation samples for the second part of the recovered code word by forming an inverse transform of said intermediate product samples, each of said correlation value samples providing the correlation value for the second part of said code words.

15. A detecting data processor as claimed in claim 10, wherein at least one of said first plurality of code word coefficients and said second plurality of code word coefficients forming said first and second parts of said code word are combined with the material in accordance with a permutation code, wherein said decoding processor is operable to reverse the permutation of at least one of said first and said second recovered code word coefficients in accordance with said permutation code.

16. A detecting data processor as claimed in claim 10, wherein at least one of said first plurality of code word coefficients and said second plurality of code word coefficients forming said first and second parts of said code word are combined with the material in accordance with a permutation code, wherein one of said detecting processor is operable to reverse the permutation of at least one of said first and said second re-generated code word coefficients in accordance with said permutation code.

17. A system for identifying the recipient of a material item, said system comprising:
an encoding data processor for generating at least one marked co y of an original item of material by introducing one of a predetermined et of code words into a copy of said material item, said apparatus com rising:
a code word generator operable to provide said code word having a plurality of code word coefficients, and
a encoding processor operable to combine the code word coefficients with said material, wherein
each of said plurality of code words of said set is uniquely associated with a data word having first and second fields, each of a set of values of said first field being represented as a first part of said code word having a first plurality of coefficients, and said second field is represented as a second part of said code word having a second plurality of coefficients;
said encoding data processor being configured to generate said marked material item by introducing a code word generated from a seed uniquely identifying said recipient;
a detecting data processor configured to identify at least one of set of code words present in a marked version of an item of material, said marked version having been formed by combining each of a plurality of samples of an original version of said material item with one of a corresponding plurality of cod word coefficients, each code word being uniquely associated with a data word having first and second fields, each of a set of values of said first field being e presented as a first part of said code word having a first plurality of coefficients, and said second field being represented as a second part of said code word having a second plurality of coefficients, and each value of said first field being represented as a predetermined cyclic shift of said first plurality of code word coefficients of said first part of said code word, said detecting data processing apparatus comprising:
a decoding processor operable to generate a recovered code word from said marked material item, and
a election processor operable to detect at least one first data field value an at least one second data field value by
correlating the first part of the recovered code word with a first part of each regenerated code word from the set of code words to generate a correlating value for each regenerated code word,
detecting the value of the first field value from a corresponding correlating value exceeding a predetermined threshold,
correlating the second part of the recovered code word with a second art of each regenerated code word from the set of code words to generate a second correlation value for each regenerated code word, and
detecting the value of the second field value from a corresponding second correlation value exceeding a predetermined threshold; and said detecting data processor, being configured to detect with a predetermined false positive probability the recipient by detecting the presence of the code word in said material.

18. A method of generating at least one marked version of an original item of material by introducing one of a predetermined set of code words into a copy of said original material item, said method comprising,
forming said code word by generating a plurality of code word coefficients; and
combining the code word coefficients with said material, wherein
each of said plurality of code words of said set is uniquely associated with a data word having first and second fields, each of a set of values of said first field being represented as a first part of said code word having a first plurality of coefficients, and said second field is represented as a second part of said code word having a second plurality of coefficients.

19. A method of identifying at least one of set of code words present in a marked version of a material item, said marked version having been formed by combining each of a plurality of samples of an original version of said material item with one of a corresponding plurality of code word coefficients, each code word being uniquely associated with a data word having first and second fields, each of a set of values of said first field being represented as a first part of said code word having a first plurality of coefficients, and said second field being represented as a second part of said code word having a second plurality of coefficients, and each value of said first field being represented as a predetermined cyclic shift of said first plurality of code word coefficients of said first part of said code word, said method comprising
generating a recovered code word from said marked material item; and
detecting at least one first data field value and at least one second date field
correlating the first part of the recovered code word with a first part of each regenerated code word from the set of code words to generate a correlation value for each regenerated code word,
detecting the value of the first field value from a corresponding correlation value exceeding a predetermined threshold,
correlating the second part of the recovered code word with a second part of each regenerated code word from the set of code words to generate a second correlation value for each regenerated code word; and
detecting the value of the second field value from a corresponding second correlation value exceeding a predetermined threshold.

20. A computer-readable medium encoded with a computer program providing computer executable instructions, which when loaded onto a data processor configures the data processor to operate as the encoding data processing apparatus according to claim 1.

21. A computer-readable medium encoded with a computer program providing computer executable instructions, which when loaded onto a data processor configures the data processor to operate as the detecting data processor according to claim 10.

22. A computer-readable medium encoded with a computer program providing computer executable instructions, which when loaded on to a data processor causes the data processor to perform the method according to claim 18.

23. A computer-readable medium encoded with a computer program providing computer executable instructions, which when loaded on to a data processor causes the data processor to perform the method according to claim 19.

24. A receiver operable to receive signals representative of material items, comprising
   an encoding data processing apparatus according to claim 1, operable to combine at least one code word with the received signals, said code word being provided to identify uniquely said received signals.

25. An encoding data processing apparatus for generating at least one marked copy of an original item of material by introducing one of a predetermined set of code words into a copy of said material item, said apparatus comprising
   means for forming said code word by generating a plurality of code word coefficients, and
   means for combining the code word coefficients with said material, wherein
   each of said plurality of code words of said set is uniquely associated with a data word having first and second fields, each of a set of values of said first field being represented as a first part of said code word having a first plurality of coefficients, and said second field is represented as a second part of said code word having a second plurality of coefficients.

26. A detecting data processing apparatus operable to identify at least one of set of code words present in a marked version of an item of material, said marked version having been formed by combining each of a plurality of samples of an original version of said material item with one of a corresponding plurality of code word coefficients, each code word being uniquely associated with a data word having first and second fields, each of a set of values of said first field being represented as a first part of said code word having a first plurality of coefficients, and said second field being represented as a second part of said code word having a second plurality of coefficients, and each value of said first field being represented as a predetermined cyclic shift of said first plurality of code word coefficients of said first part of said code word, said detecting data processing apparatus comprising
   means for generating a recovered code word from said marked material item; and
   means for detecting at least one first data field value and at least o value by
   correlating the first part of the recovered code word with a first part of each regenerated code word from the set of code words to generate a correlation value for each regenerated code word,
   detecting the value of the first field value from a corresponding correlation value exceeding a predetermined threshold,
   correlating the second part of the recovered code word with a second part of each regenerated code word from the set of code words to generate a second correlation value for each regenerated code word; and
   detecting the value of the second field value from a corresponding second correlation value exceeding a predetermined threshold.

* * * * *